United States Patent

Underwood et al.

[11] Patent Number: 5,805,673
[45] Date of Patent: Sep. 8, 1998

[54] METHOD AND APPARATUS FOR RELIABLE ACCESS TO AUDIO AND FACSIMILE MESSAGE STORAGE AND RETRIEVAL SYSTEM

[75] Inventors: James M. Underwood, Newbury Park; Nam H. Pham, Carpinteria, both of Calif.

[73] Assignee: Digital Sound Corporation, Carpinteria, Calif.

[21] Appl. No.: 515,574

[22] Filed: Aug. 16, 1995

Related U.S. Application Data

[63] Continuation of Ser. No. 426,646, Apr. 21, 1995, abandoned, which is a continuation of Ser. No. 205,052, Mar. 2, 1994, abandoned.

[51] Int. Cl.$^6$ .................................................. H04M 11/00
[52] U.S. Cl. .......................... 379/93.01; 379/67; 358/402
[58] Field of Search .................................. 379/67, 88, 89, 379/93, 94, 95, 97, 100, 93.01, 93.09, 93.26, 93.32, 93.34, 100.01; 358/434, 435, 439, 402, 403, 409, 411, 412

[56] References Cited

U.S. PATENT DOCUMENTS

| | | | |
|---|---|---|---|
| 4,837,798 | 6/1989 | Cohen et al. | 379/88 |
| 4,850,008 | 7/1989 | Berg et al. | 379/93 |
| 5,018,191 | 5/1991 | Catron et al. | 379/100 |
| 5,065,427 | 11/1991 | Godbole | 379/100 |
| 5,189,693 | 2/1993 | Nakajima | 379/100 |
| 5,193,110 | 3/1993 | Jones et al. | 379/94 |
| 5,208,850 | 5/1993 | Kino | 379/88 |
| 5,224,158 | 6/1993 | Yuuki | 379/97 |
| 5,255,311 | 10/1993 | Yoshida | 358/434 |
| 5,270,834 | 12/1993 | Kuwahara | 379/100 |
| 5,280,519 | 1/1994 | Nakajima et al. | 379/100 |
| 5,291,546 | 3/1994 | Giler et al. | 379/100 |
| 5,349,634 | 9/1994 | Shimomura | 379/100 |

(List continued on next page.)

OTHER PUBLICATIONS

Publication, *CCITT Draft Recommendation T.4*, Omnicom PPI, Philips Business Information, Inc., pp. 1–41.

Publication, *CCITT Draft Recommendation T.4*, Omnicom PPI, Philips Business Information, Inc., pp. 1, 26–81, 4–116.

Section 7, "Telephone Network and ISDN—Operation, Numbering, Routing and Mobile Service, Recommendations E.100–E.333" CCITT vol. II—Fascicle 11.2, Melbourne, 14–25 Nov. 1988.

"Description of the Analog Voiceband Interface Between the Bell System Local Exchange Lines and Terminal Equipment," Bell System Technical Reference, Jan. 1983, AT&T.

*Primary Examiner*—Krista Zele
*Assistant Examiner*—Scott L. Weaver
*Attorney, Agent, or Firm*—Christie, Parker & Hale, LLP

[57] ABSTRACT

Reliable access to audio and facsimile message storage and retrieval systems is accomplished by employing a listening procedure to differentiate voice message clients from fax clients and, upon identifying a fax client, performing an extended listening procedure to differentiate between a sending fax client and a retrieving fax client. During the listening procedure, the system generates a ring tone, immediately after connecting the call, comparable in duration to that normally expected by a caller during a typical call attempt, thereby rendering the listening procedure transparent to a human caller. The masked listening procedure allows detection of standard calling fax machine, polling fax machines and accommodates a blind polling procedure for use with fax machines not equipped for standard call in polling. Blind polling is accomplished by monitoring a fax receiver in the system for a called station tone (CED) or if a CED tone is missed by the system, detection of V.21/V.27 transmissions allows the establishing of a messaging session. Absence of CED tone, CNG tone or V.21 or V.27 transmissions during the listening period causes the system to classify the call as a voice call and produce voice prompts to a presumed human caller. Continuous monitoring for CNG tone detection allows reclassification of the call as a fax sending call, allowing combination voice and fax messages to be recorded.

29 Claims, 13 Drawing Sheets

U.S. PATENT DOCUMENTS

| | | | |
|---|---|---|---|
| 5,428,673 | 6/1995 | Nakagawa et al. | 379/100 |
| 5,440,619 | 8/1995 | Cann | 379/97 |
| 5,444,771 | 8/1995 | Ohnishi | 379/100 |
| 5,448,626 | 9/1995 | Kajiya et al. | 379/67 |
| 5,459,584 | 10/1995 | Gordon et al. | 358/434 |
| 5,535,204 | 7/1996 | Li | 370/76 |

METHOD AND APPARATUS FOR RELIABLE ACCESS TO AUDIO AND FACSIMILE MESSAGE STORAGE AND RETRIEVAL SYSTEM

This application is a continuation of Ser. No. 08/426,646, filed Apr. 21, 1995, now abandoned which is a continuation of application Ser. No. 08/205,052, filed Mar. 2, 1994, now abandoned.

FIELD OF THE INVENTION

This invention relates generally to the field of message storage and retrieval systems which accommodate multiple formats such as voice and facsimile. More particularly, the invention provides an interactive communications system for determining the type and identification of a calling party and the message direction with accommodation for multiple interface formats in the calling party equipment.

PROPRIETARY RIGHTS NOTICE

A portion of the disclosure of this patent document contains material which is subject to copyright protection. The copyright owner has no objection to the facsimile reproduction by anyone of the patent document as it appears in the Patent Trademark Office file or records but otherwise reserves all other copyright rights whatsoever.

BACKGROUND OF THE INVENTION

Messaging systems for transfer of information have become widespread for both personal and business use. Voice messaging systems which allow a caller to leave a verbal message for a called party, who is not immediately available, range from simple answering machines to complex messaging systems. Such messaging systems allow storage of messages, retrieval of those messages by the service subscriber while continuing to store the message, transfer of the message to mailboxes of other subscribers, and distribution of voice mail messages to a plurality of subscribers. Similarly, electronic mail systems allow sending, receiving and distribution of written information between senders and subscribers to the mail network.

Recently, facsimile messaging has been added as a feature of certain messaging systems. The majority of these systems employ the capability to receive a facsimile transmission into a data storage memory in a manner comparable to receiving a verbal message from a telephone caller. The fax message is then retrieved from the system in a manner similar to retrieving a voice message. The subscriber contacts the messaging system and communicates with the system either verbally with appropriate manual activation of a receiving fax machine, or directly through the fax machine without verbal communication.

Various systems have been developed for the concept of unified messaging wherein voice messages, facsimile messages, and in certain cases, electronic mail messages may be received and distributed through a common messaging system. See for example, U.S. Pat. No. 4,837,798 to Cohen, et al. As disclosed in Cohen, protocols for interfacing various types of messages with various sending and retrieving means must be uniform and the structure of the various interfaces between the messaging system and the party sending the message with his associated message sending equipment, if any, and the subscriber with his associated message receiving equipment, if any, must be uniform.

Part of the utility of messaging systems however, is the ability to retrieve messages from locations remote from the subscriber's place of business. Voice messaging has long had this capability through use of DTMF keypads on touch-tone telephones to allow a subscriber to retrieve voice messages from a messaging system.

However, for messaging systems employing facsimile capability or combined voice and facsimile capability, equipment compatibility problems may arise. The proliferation of facsimile machines with varying capabilities renders the highly uniform protocol and structure arrangement typically required of a messaging system to be unworkable. Most facsimile devices operate using transmission and session-control protocols which conform to standards of the International Telegraph and Telephone Consultative Committee (CCITT). These standards however, are "recommendations" which may or may not be implemented in their entirety by devices produced by various hardware manufacturers. The primary connection protocol standard for facsimile machines is CCITT recommendation T.30. In addition to stand alone facsimile machines, fax devices are presently being integrated into personal computers (PC's). PC fax devices will typically rely upon software operating on the PC for at least some portion of the interface. The CCITT T.30 procedures and protocols are, for the most part, accommodated by both stand alone and PC fax devices. To improve the general utility of PC fax devices, standards are also promulgated by the Telecommunications Industry Association (TIA). Two "classes" of command/control protocol for standardizing facsimile transmission and reception in PC fax devices were developed by the TIA. TIA/EIA-578 provides standards for devices designated "class 1" devices, while TIA/EIA-592 provides standards for more complex "class 2" devices.

Class 1 provides a simple commands/status interface to a set of primitive services implemented by a fax system which relies substantially exclusively on the PC for control of simple silicon devices comprising the fax equipment itself. T.30 protocol implementation is accomplished through software on the PC.

Class 2 products adhering to TIA-592 typically are more sophisticated and contain microprocessors and associated sets of stored instructions to implement T.30 procedures thereby relieving the controlling PC of that activity. Software for the fax device is typically stored in non-volatile memory such as ROM or EPROM.

A facsimile messaging system is typically centrally located and can be structured with sufficient complexity to accommodate most facsimile devices which transmit messages to the messaging system. Retrieval of messages, however, must also accommodate differing capabilities of the various fax devices to allow a subscriber to retrieve messages at locations remote from the messaging system and with equipment that may be available at the remote site. While the CCITT T.30 standard anticipated the need for reception on demand, or "polling" capability, many low priced fax machines and PC fax systems do not have this capability. In addition, many systems which otherwise conform to TIA-592 as class 2 devices, do not properly implement the T.30 polling access procedure. To successfully implement a fax messaging and retrieval service, a messaging system must be able to accommodate the shortcomings of the installed base of fax devices.

The present invention provides an apparatus and method for a combined voice and facsimile messaging system which accommodates the many shortcomings of the installed base of facsimile machines and provides the capability for both voice and facsimile message storage and retrieval which is substantially transparent to the messaging caller.

SUMMARY OF THE INVENTION

The present invention provides a messaging system which accommodates subscribers having varying services including voice only messaging, facsimile only messaging, and combined voice and facsimile messaging. Subscriber mailboxes are structured within the system to provide those services as desired by the subscriber. The system employs a listening procedure to differentiate voice message clients from fax clients, and upon identifying a fax client, an extended listening procedure is accomplished to differentiate between a sending fax client and a retrieving fax client. To accommodate a human voice caller during the listening procedure, the system generates a ring tone immediately after connecting the call. The generated ringing tone is comparable in duration to that normally expected by a caller during a typical call attempt. By generating the ringing tone immediately before the silent listening period commences, the system effectively precludes the potential for a "dead line" perception on the part of a voice messaging caller. Generation of the ringing tone burst when the call is answered, conditions the caller to expect the ususal silent period following the ringing tone. The masked listening procedure is most effective when used with trunk-side telephone access services that do not automatically provide any ring tone generation. Examples of such services are Dialed Number Identification Service (DNIS) and Direct Inward Dialing (DID), When the server system uses these optimal services, the caller will only hear ringing tone from the server, consequently the ring tone after answer by the server will appear to have a normal cadence. In other cases, such as standard lineside and Integrated Services Digital Network (ISDN) access, the server-generated ringing may occur at an unexpected point in the established ringing cadence thereby alerting the caller to a change in call status. In this latter case, the server generated ringing tone is less effective in conditioning the caller for the extended silence during the listening period by the messaging system.

Differentiating between fax-sending clients and fax-receiving clients is accomplished in the listening procedure by detecting either the CCITT-specified calling-station (CNG) tone, the CCITT called-station (CED) tone, or a V.21 (or) V.27 transmission corresponding to standard CCITT T.30 fax protocol message elements. If CNG tone is detected, the system initially classifies the call as a fax-sending client and initiates standard T.30 procedures to establish a message-reception session by sending the CED tone. Standard T.30 polling access is supported by this case since it is differentiated after the initial called-station response in normal T.30 communication protocol. The system subsequently reclassifies the call as a fax retrieval client call if the calling device sends a required set of protocol messages used.

If the CED tone or a V.21/V.27 transmission is detected, the system classifies the call as a fax retrieval client using a blind reception method and establishes the messaging session by sending calling station messages instead of called station messages.

Finally, the system accommodates manual operation of fax machines by a calling client. Absence of CED tone, CNG tone, and V.21/V.27 transmissions during the masked listening period causes the system to classify the call as a voice call and announcements are delivered to the presumed human caller. Using properly worded announcements, the system instructs the voice caller that fax transmissions may be initiated by pressing the start button on the fax machine. When voice messages are recorded, the system employs continuous CNG tone detection to identify fax transmission attempts that accompany voice message recording. In this case it reclassifies the call as a fax-sending call, permitting a fax message to be recorded during the same call that an associated voice annotation is recorded.

BRIEF DESCRIPTION OF THE DRAWINGS

FIG. 1b is a block diagram of a line interface card (LIC) for facsimile message reception and transmission for incorporation in one or more line interface card slots in the messaging system of FIG. 1a;

DETAILED DESCRIPTION OF THE INVENTION

Figure 1A:
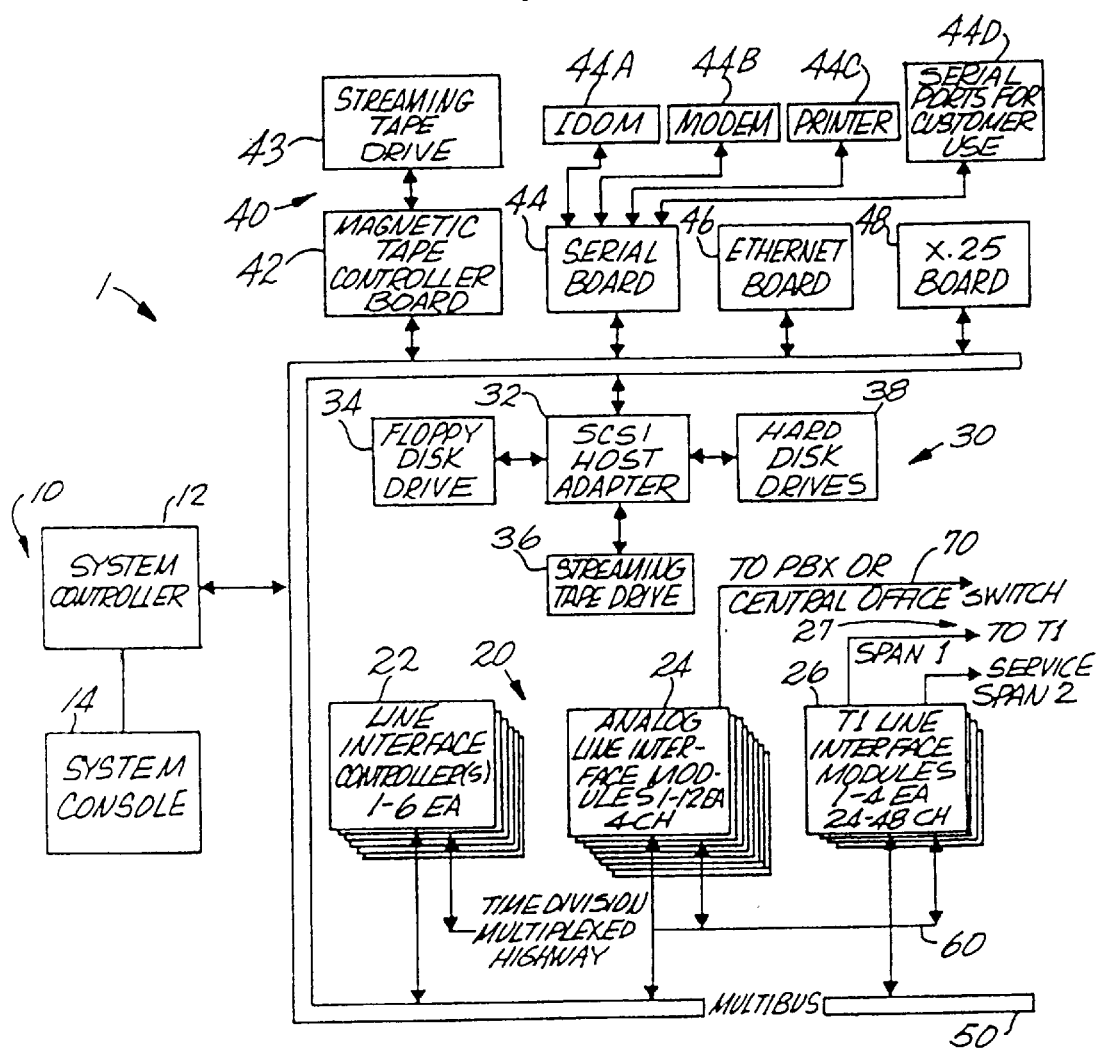
FIG. 1a is a block diagram of a messaging system in which the present invention may be employed.

Referring to the drawings, FIG. 1a shows a voice messaging system 1 providing a platform for implementing the present invention. The system includes control elements 10, telephone line interface elements 20, and peripheral interface elements 30 and 40. These elements exchange data and control signals on a Multibus® 50 implementing the protocol developed by Intel Corporation. Multibus® is a registered trademark of Intel. An independent bus 60, identified as a time division multiplexed (TDM) highway, enables rapid internal transfer of digitized voice band data. A system exemplary of the architecture shown in FIG. 1a is a VoiceServer 2110 which is commercially available from Digital Sound Corporation, Carpinteria, Calif. The system is described in the VoiceServer System Reference Manual available from Digital Sound Corporation.

The control elements include a system controller 12 which in the exemplary embodiment is an Intel 386 Class CPU with conventional support electronics operating with a system console 14 containing a display and keyboard entry system of a conventional type. The system controller is coupled for communication through the Multibus.

The telephone interface elements include one or more analog line interface modules (LIM) 24 which receive incoming calls on a public switch telephone line 70. The analog LIMs digitize all incoming call signals and assign the call to a channel in the system.

If incoming digital lines are available, such as lines following the T1 standard protocol, then one or more T1 LIMs 26 of conventional design are provided to couple T1 lines to the digital elements of the system. The T1 interfaces provide 24 channels of audio communication while operating at an aggregate bit rate of 1.544 megabits per second, according to CCITT recommendations G.703 and G.704.

Digital signal processing of voice messages and control signals is done by one or more line interface controllers (LIC's) 22. LIC's are configured to support voice messaging or fax messaging as will be described in greater detail subsequently. Voice messaging LIC's operable in the embodiment disclosed for the invention are described in U.S. Pat. No. 5,267,322 issued on Nov. 30, 1993 to Digital Sound Corporation, assignee of the present application.

Figure 1B:
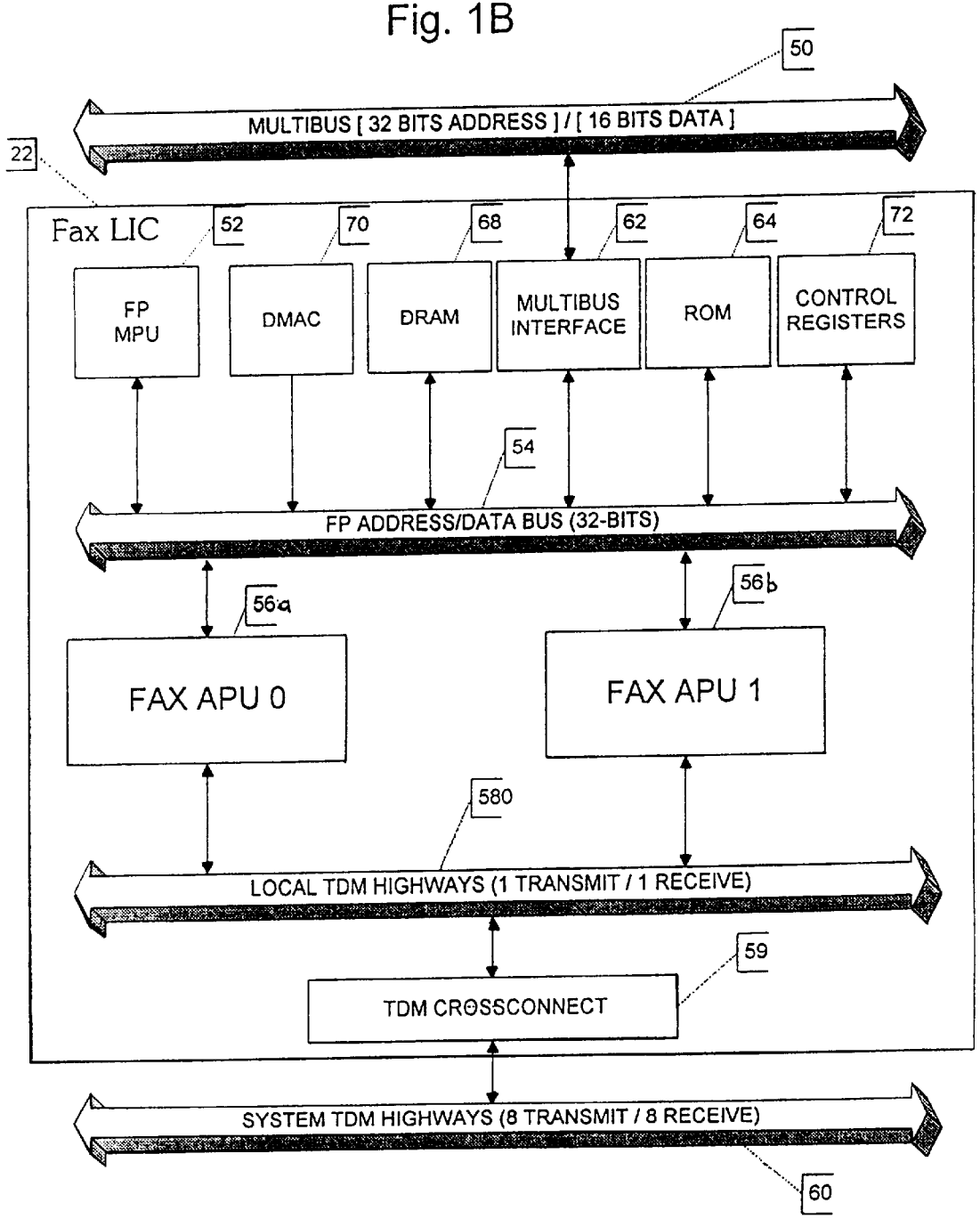
Figure 1C:
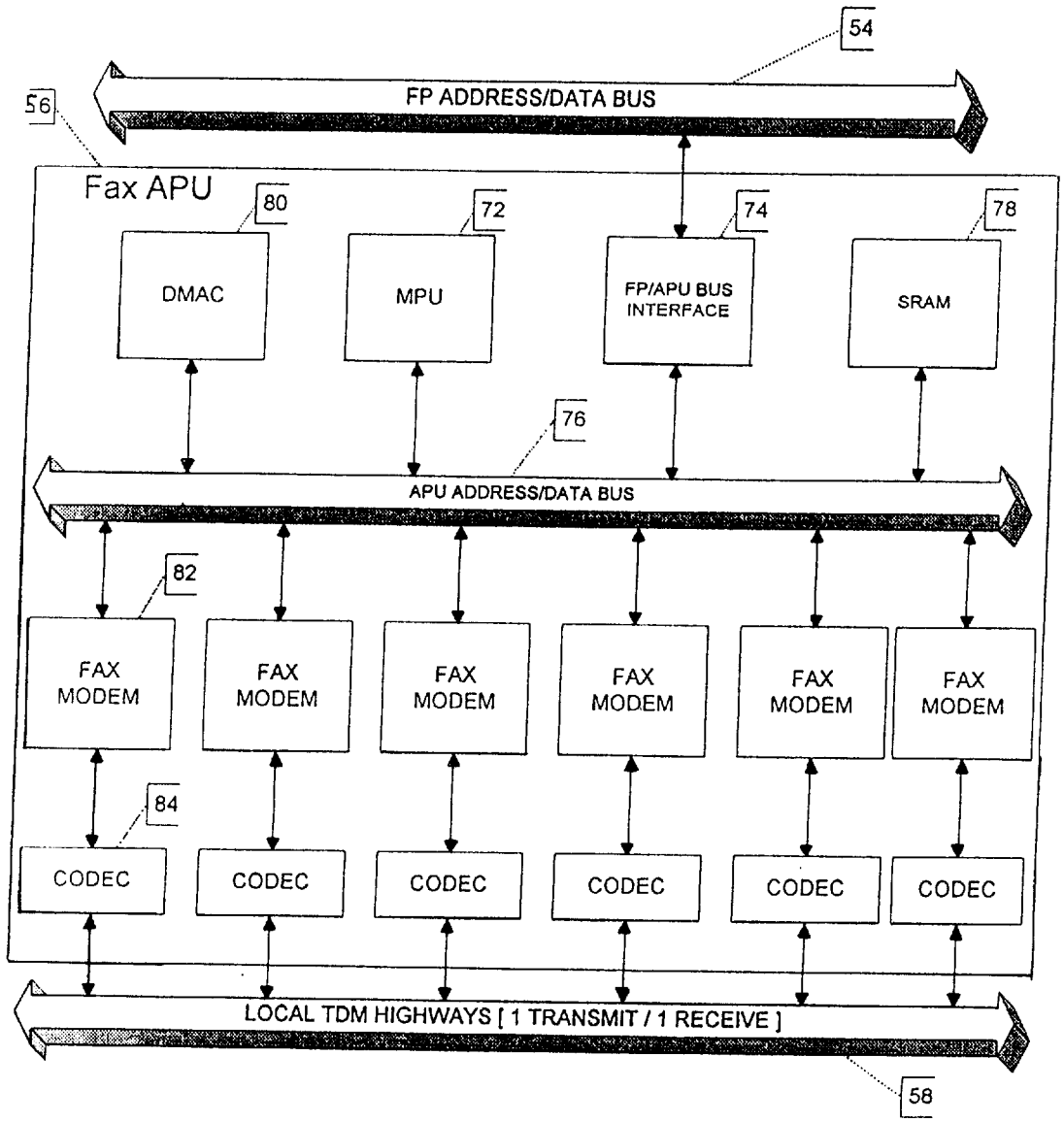
FIG. 1c is a block diagram of a fax arithmetic processing unit (APU) for incorporation as a fax APU in the fax LIC of FIG. 1b.

Fax LICs for use in the present invention are shown in detail in FIGS. 1b and 1c. Each fax LIC 22 incorporates a microprocessor unit referred to hereafter as the foundation processor (FP) 52 which communicates through an address/data bus 54 with application processing units (APUs) 56a and 56b. The APUs in turn communicate on a local TDM highway 58 which communicates through a TDM cross-connect 60 to the system TDM highway 60. A Multibus interface 62, interfaces the foundation processor address/data bus 54 on the fax LIC to the Multibus. A read only memory (ROM) 64 is provided for MPU firmware, and a dynamic random access memory (DRAM) 68 is provided for interactive storage. A direct memory access controller (DMAC) 70 and control registers 72 are also provided for use in data and command communication as is well known to those skilled in the art.

The fax APUs are shown in detail in FIG. 1c. Each APU incorporates a microprocessor unit (MPU) 72 for operational control. Address/data from the foundation processor address/data bus is received through an FP/APU bus interface 74 and communicated within the APU on APU address/data bus 76. A static ram (SRAM) 78 provides data storage for the APU and a multifunction DMAC 80 is employed for enhanced memory access and hardware timer support. A plurality of fax modems 82 are connected to the APU address/data bus. Each fax modem communicates through a Pulse Code Modulation Coder/Decoder (CODEC) 84 to the local TDM highway on the fax LIC. Programmatic commands, data and status are communicated between the computing elements of the system, specifically the system controller 12, the LIC foundation processors 52 and individual application processing unit MPU's 72 by means of a common set of overlapping address spaces implemented by a combination of the system Multibus 50, the foundation processor bus 54 and the application processor bus 76 and their interconnecting elements 62, 74. Commands issued by programs executing on the system controller 12 are copied to commonly accessible locations of the fax LIC's DRAM 68. The system controller notifies the recipient FP MPU by generating a common MPU interrupt signal through manipulation of the FAX LIC control registers 72. Command parameters are validated by a control program executing on the LIC FP MPU 52 and one or more "micro commands" is copied to a commonly addressable area of FAX APU SRAM 78. The recipient fax APU 56 is notified through a common MPU interrupt signal generated by the FP/APU Bus Interface 74. The program necessary to implement the various procedures required by the CCITT T.30 protocol is stored in the fax APU SRAM 78 and is executed by the fax APU MPU 72. The various control registers of the fax modem 82 are manipulated and interpreted by the fax APU MPU 72 as required to complete the requested series of commands in accordance with the CCITT T.30 standard. Command status and received fax data are placed in areas of the fax APU SRAM 78 commonly accessible to both the fax APU MPU and the fax LIC FP MPU 52. The fax LIC FP MPU 52 is notified of command completion by a common MPU interrupt signal generated by the fax APU MPU 72 through manipulation of the FP/APU bus interface 74. Command status and received fax data is similarly relayed to the system controller 12 when the fax LIC FP MPU 52 places status and data in areas of the fax LIC DRAM 68 which are commonly accessible to the FP MPU 52 and the system controller 12. The system controller 12 is notified of status and data availability when the FP MPU 52 generates a common MPU interrupt signal by manipulating the Multibus interface 62. Received fax data is stored on the system's hard disk drives 38 through commands to the SCSI host adapter 32. A similar method, which will be apparent to those skilled in the art, is used during transmission of fax data previously stored on the system.

Returning to FIG. 1a, depending upon the needs of the system user, a plurality of peripheral devices are interfaced to the system. For example, a small computer system interface (SCSI) host adapter 32 is coupled to the multibus for connection of a floppy disk drive 34, streaming tape drive 36, and hard disk drives 38. The hard disk drives provide primary storage for message data and can also provide storage for system software. The disk drives are indirectly coupled to the LIC's via the Multibus. A magnetic tape controller board 42 is provided to interface the Multibus to a second streaming tape drive 43 for data backup and other functions. A serial communications interface board 44 is available in the embodiment shown in the drawings for connection of a plurality of serial devices such as an input/output distribution module (IODM) 44a, a modem 44b, a printer 44c, or other serial ports 44d for customer use. Additional system communications are provided using an Ethernet board 46 and an X.25 board 48 as conventionally known in the art.

Software control for operation of the invention on the hardware platform shown in FIGS. 1a through 1c is demonstrated in the flow diagrams of FIGS. 2 through 8. The messaging system incorporating the present invention receives incoming calls by parties desiring to leave voice or fax messages and subscribers desiring to retrieve messages left on the system. Each "mailbox" provided by the system for a subscriber is identified by a unique telephone number. Consequently, both messaging callers and subscribers dial into the system using that identification number. Such incoming calls are presented to the server system on standard analog public access network lines or on T1 lines, depending on service availability from the local telephone exchange serving the server site.

Figure 2:
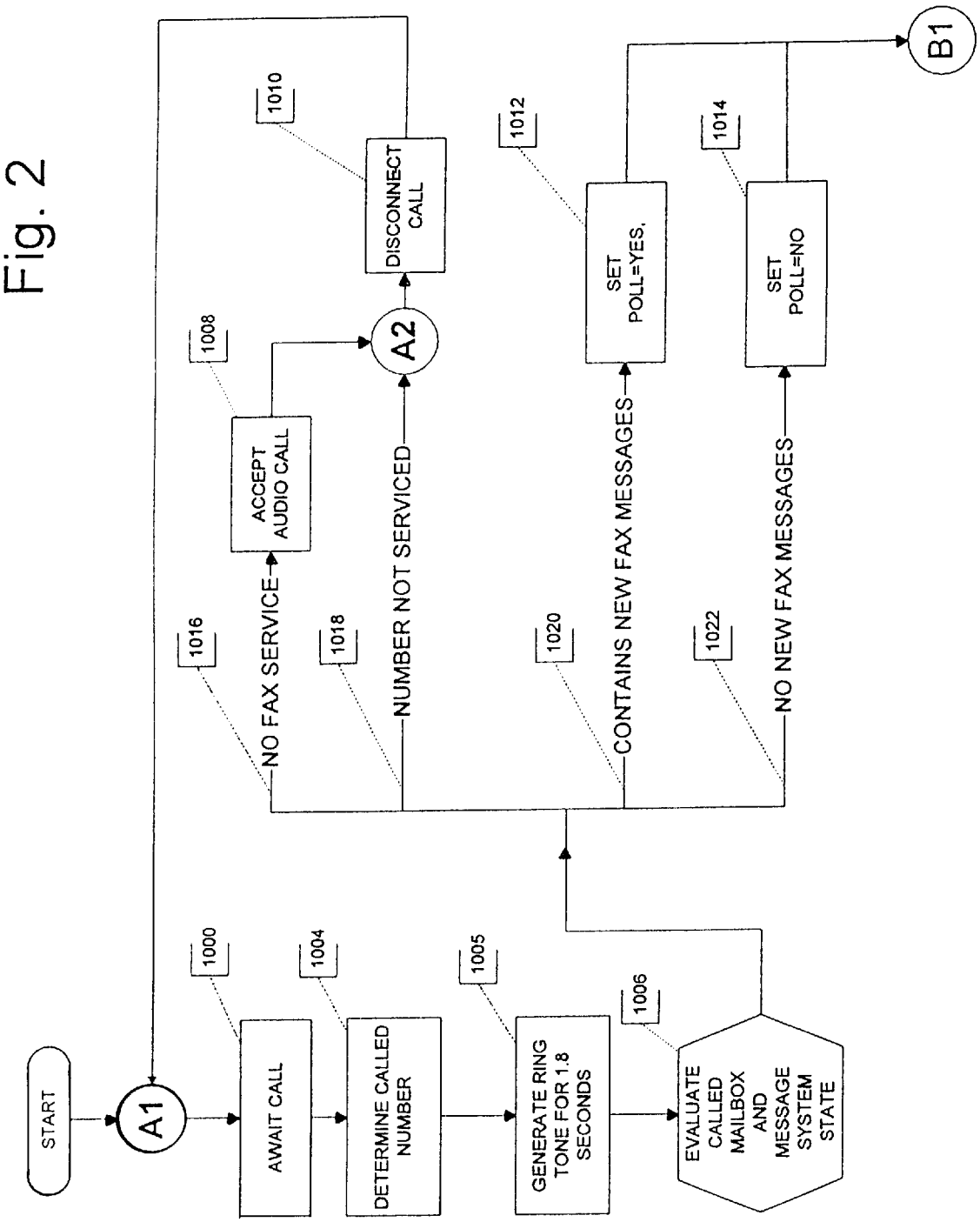
FIGS. 2 through 9 are software flow charts for programming implementing the present invention on a voice messaging system hardware platform as shown in FIGS. 1a through c.

The messaging system in its initial state is therefore awaiting incoming calls as identified in FIG. 2 with the await call block 1000. Upon receiving a call, the messaging system determines the called number, block 1004. The called number information is provided as a series of tones generated by either the dialed number information service (DNIS) over T1 lines, or the direct-inward-dial (DID) service. The tones transmitted by these services are detected and their identity communicated to the messaging program. Just as a series of tones are used to identify the desired called number when originating a call from a touchtone phone, the tones sent by the DNIS or DID service are used to identify the called mailbox number which typically corresponds to the called number.

To accomplish processing of the dialed number information and other system functions in a transparent manner to a voice caller, the system generates ring tone block 1005. The normal cadence for ringing in most telephone systems is approximately two seconds of ring tone followed by four seconds of silence. The embodiment of the invention, as disclosed in the drawings, generates a ring tone for approximately 1.8 seconds which approximates the normal ringing tone burst duration, but limits the overall time impact for providing access to the system based on other system processing time frames, to be discussed subsequently.

The incoming call is evaluated based on the called mailbox and the status of messages for that mailbox in block 1006. Incoming calls may be of four distinct types, a fax answering call, wherein a fax machine or other fax device is calling into the system to deliver a fax message, a fax messaging call in which a subscriber, using a fax machine or modem, is calling to receive fax messages, a voice answering call in which a subscriber is calling to deliver a voice message, and a voice messaging call in which a person is calling to log into his or her mailbox to retrieve voice or fax messages. The system can prescreen the type of call to a certain extent, based on the services offered for the mailbox called and the presence or lack of any fax messages in the mailbox.

If a determination is made in block 1006 that the mailbox called is not configured for fax messaging service, the no fax service branch 1016 is followed by the software and the normal procedure to accept an audio call is performed in block 1008. Voice messaging techniques are well known in the art and will not be reviewed in detail in the present specification. Upon conclusion of the audio call, the messaging system disconnects the call in block 1010 and returns through entry point Al to await further calls.

If the called number does not identify an existing mailbox on the system, the number not serviced branch 1018 is followed by the system and the call is disconnected with the system returning to the await call state.

If the called mailbox does have fax service and contains new fax messages, branch 1020 is followed by the system and the poll variable is set to "yes" in block 1012. Conversely, if the mailbox has no new fax messages, branch 1022 is followed and the poll variable is set to no in block 1014. The system then proceeds to entry point B1 in FIG. 3.

Fax messaging access by a subscriber is accommodated in the present invention to allow access by both a T.30 compliant fax machine with standard polling capability and polling-deficient fax devices which may be used by a subscriber. To accomplish this task, the system employs the elements of standard T.30 compliant fax communication with minor modifications. T.30 messages are transmitted using either the CCITT V.21 or the CCITT V.27 modulation techniques. As exemplary of the capability of the present invention, V.21 transmission is shown in the following discussion.

Figure 10:
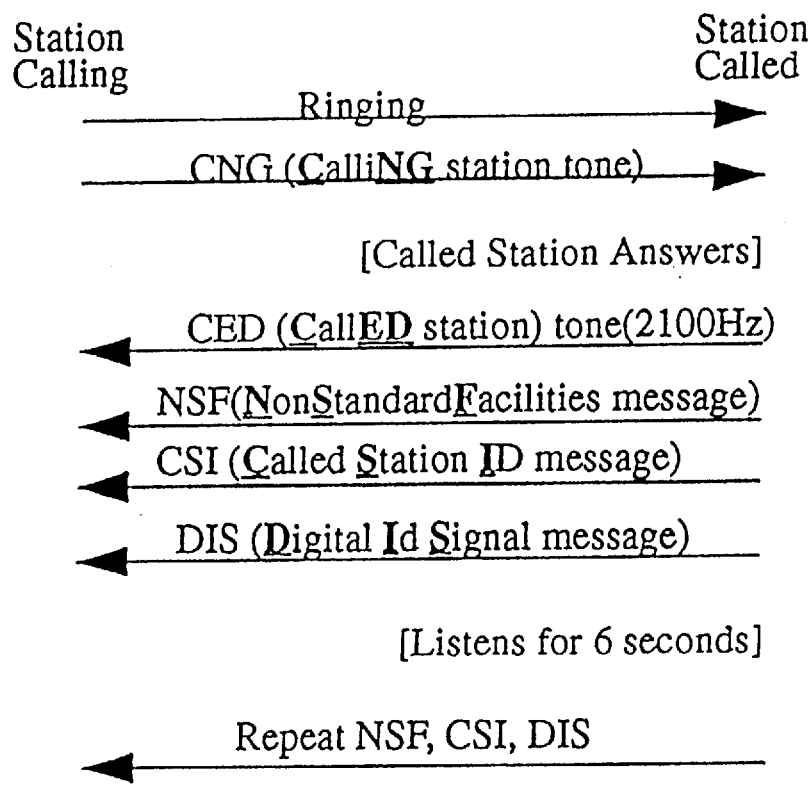
FIG. 10 is a diagrammatic representation of standard messaging protocol for initiation of a facsimile messaging session.

A normal fax communication sequence is shown in FIG. 10. The calling station dials the target number and immediately begins generation of 0.5 second bursts of the calling station (CNG) tone. Ringing initiated by the calling station results in pick-up by the called station which immediately transmits the called station tone (CED) at 2100 hz, followed, in many cases, by the non standard facilities message, followed by a called station ID message (CSI) and a digital ID signal message (DIS). The called station then listens for six seconds and repeats the NSF/CSI/DIS message transmission sequence.

Figure 11:
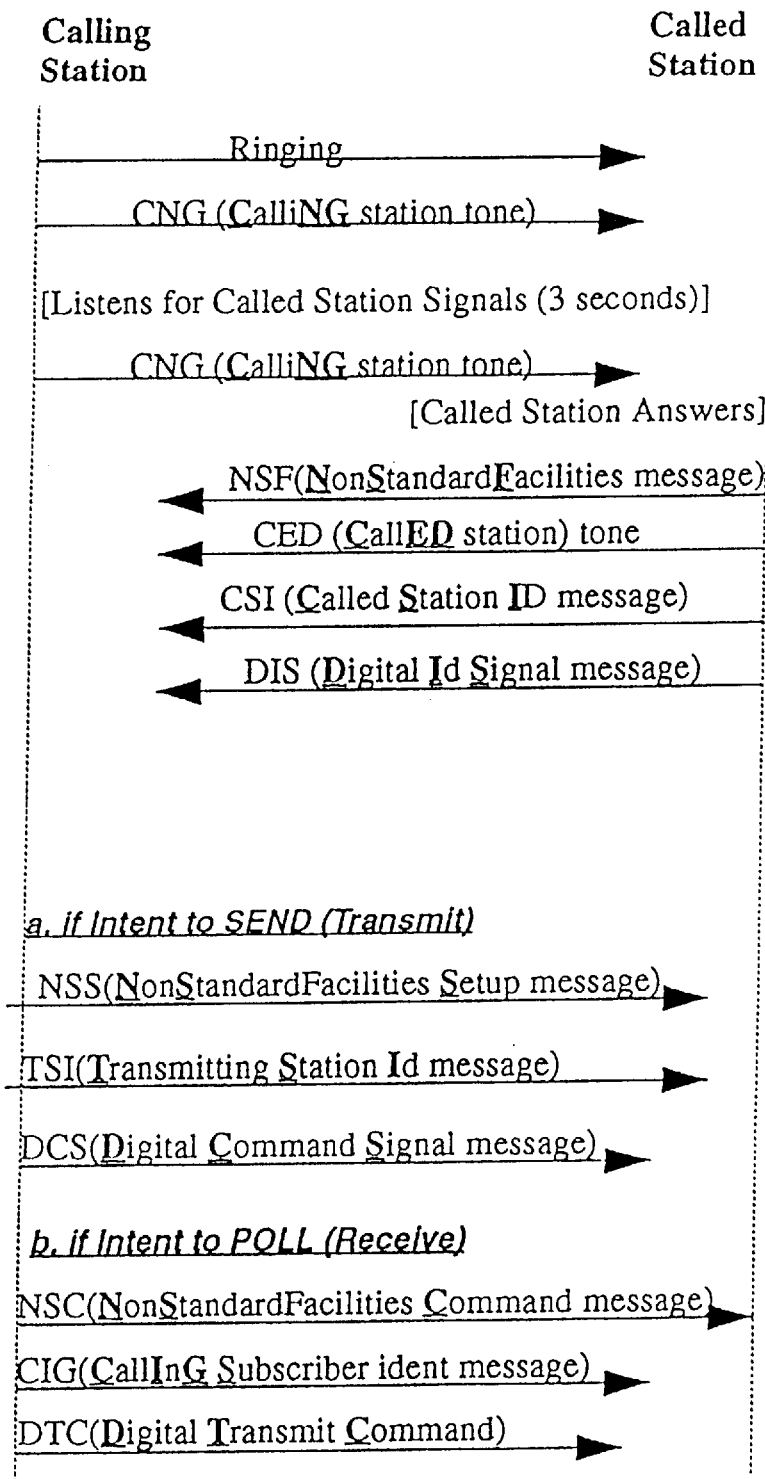
FIG. 11 is a diagrammatic representation of protocol transmissions identifying the character of a messaging session.

After the called number is dialed by the calling station, the calling fax device transmits ½ second bursts of a calling station (CNG) tone at 1100 Hz., every 3.5 seconds. This tone serves to identify the calling station as a fax device, if the call is answered by a human. Between the CNG tone bursts, the calling fax device "listens" for either CED tone or the standard V.21 messages sent by a called fax station (NSF, CSI and DIS). After the calling station decodes the CSI and DIS messages transmitted by the called station, it responds by sending its own equivalent of the NSF, CSI and DIS messages. The messages sent by the calling station are determined by the calling station's intent to send or poll. FIG. 11 depicts this entire sequence. If the calling station intends to send, it transmits a nonstandard facilities setup message followed by the transmitting station ID message (TSI) and a digital command signal message (DCS) in response to the CED, NSF, CSI and DIS messages. Alternatively, if the calling station wishes to poll (receive a transmission) it transmits a calling station identification message (CIG) and a digital transmit command (DTC).

The existence of the polling format allows incorporation of a security code for retrieval of messages by a subscriber. The security code is incorporated in either the CSI or CIG transmission depending on the fax device employed. The present invention requires correlation of the number transmitted in the CSI/CIG message with a subscriber-designated numeric security code before retrieval access to the mailbox is allowed.

Use of either a fax machine or other fax device which cannot provide proper polling message procedure is accomplished in the present invention through a "blind reception" protocol. During a blind reception, the subscriber operates his or her fax device as if it were a called fax station. After the subscriber dials the server access number, he or she forces the fax device into receive mode, acting as if it were the called station instead of the calling station. In this mode, the calling device initiates the protocol transmissions typical of an answering station by sending CED, NSF, CSI and DIS as described in FIGS. 10.

Figure 3:
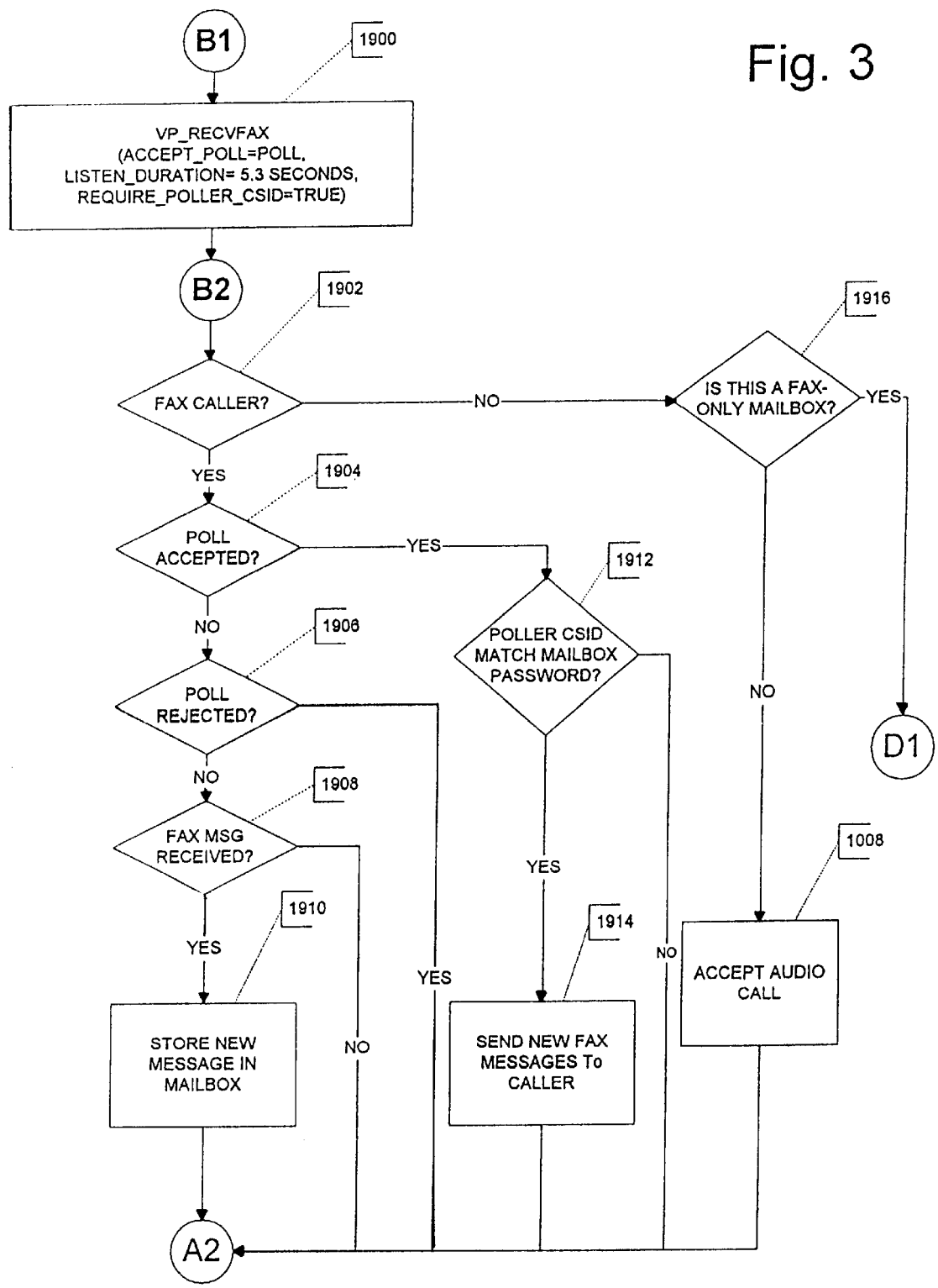

To accomplish the transmission protocol and "listening" defined above, the subroutine VP_RECVFAX is entered by the system in block 1900 of FIG. 3 with variables ACCEPT_POLL=poll, LISTEN_DURATION=5.3 seconds and REQUIRE_POLLER_CSID=true. The function of these variables will be described in greater detail subsequently. Upon return from the VP_SENDFAX procedure, the system makes a determination in block 1902 if the incoming call has been placed by a fax machine, if not, a determination is made in block 1916 if the called mailbox provides only fax messaging services, i.e. is a fax only mailbox. If the mailbox is not fax only, the system accepts the audio call, block 1008 as previously described and proceeds through entry point A2 to disconnect the call and return to the await call state.

Figure 4:
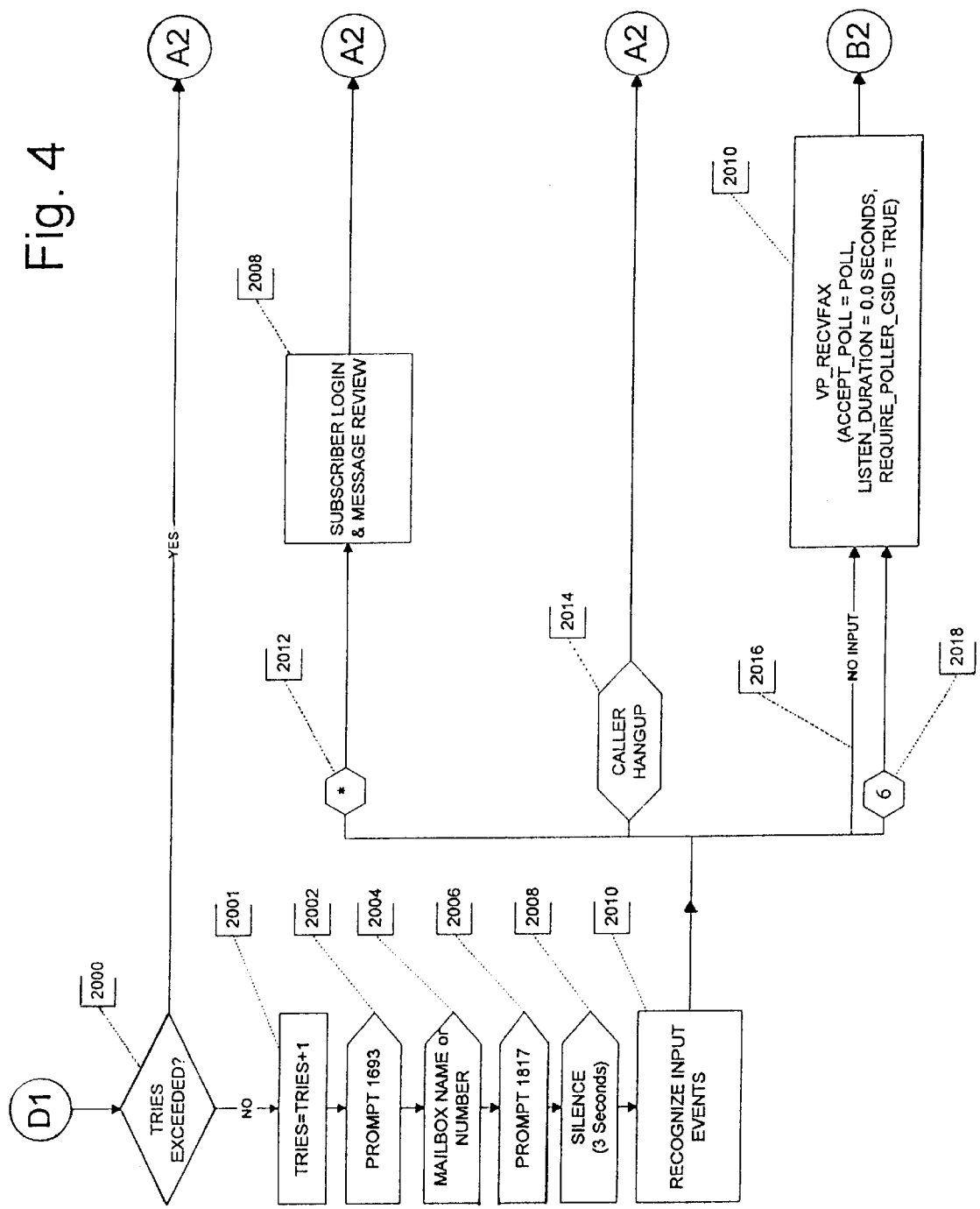

If the mailbox is a fax only mailbox, the system proceeds to entry point D1 in FIG. 4.

Figure 5:
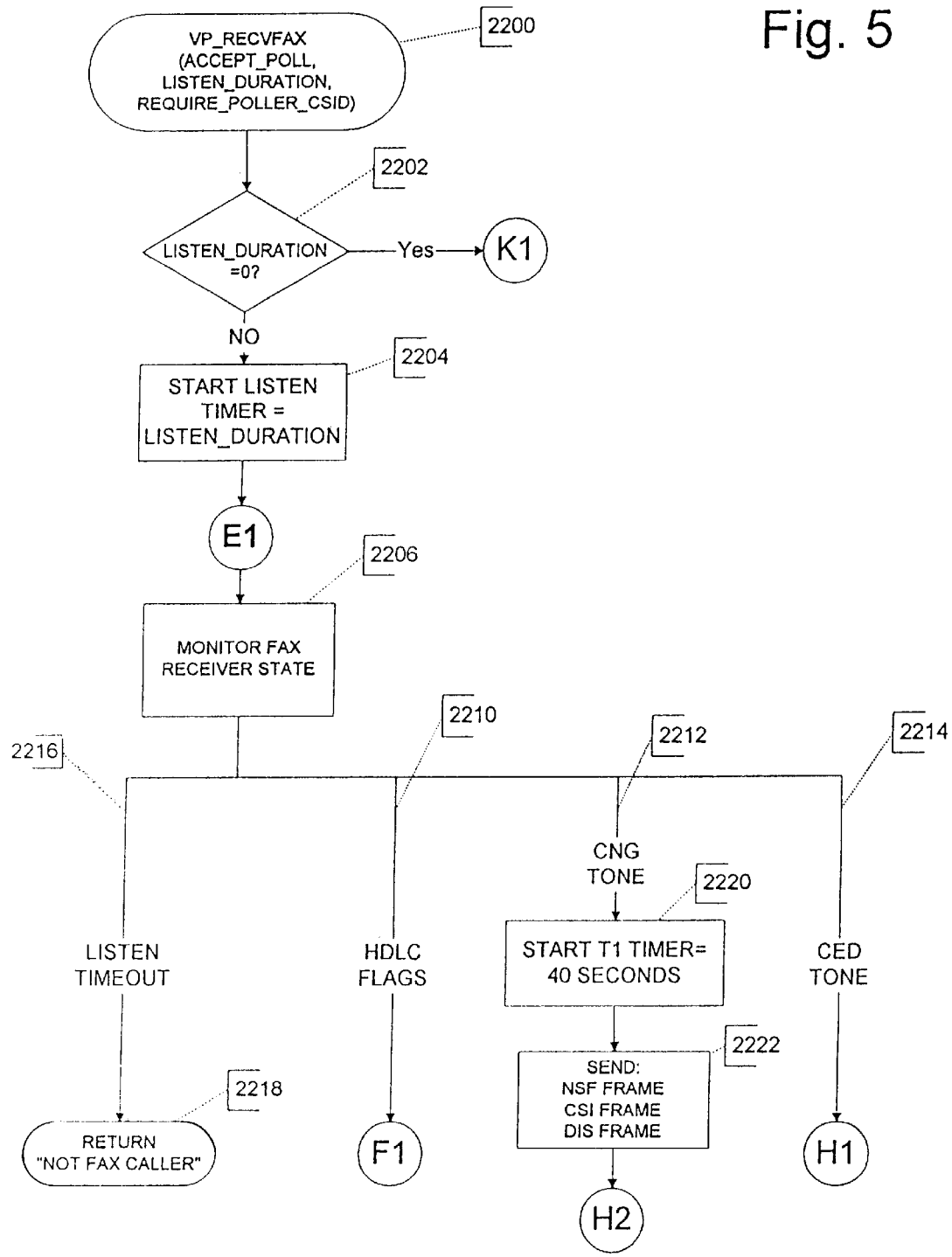

Determination of whether the call is from a fax caller (as identified in decision block 1902 of FIG. 3) is made as shown in FIG. 5. A fax answering call does not initially play any introductory prompts. Upon entering the VP_RECVFAX subroutine, the system determines if LISTEN_DURATION is set to 0 in block 2202. As previously described, LISTEN_DURATION is initially set to 5.3 seconds. As previously discussed, normal ringing cadence provides for a silence period of approximately four seconds after a two second ring period. However, the shortened ring period of 1.8 seconds presented by the system in combination with the 5.3 second listen duration provides a relative timing period in which a human caller will not consider the line to have "gone dead." The system sets a timer for the listen duration in block 2204 and monitors the fax modem 82 receiver in block 2206. If the listen timer expires, branch 2216, the system returns the determination that the call is "not a fax caller" in block 2218. Returning to FIG. 3, the system then determines if the numbered call is a fax only mailbox in block 1916.

Figure 6:
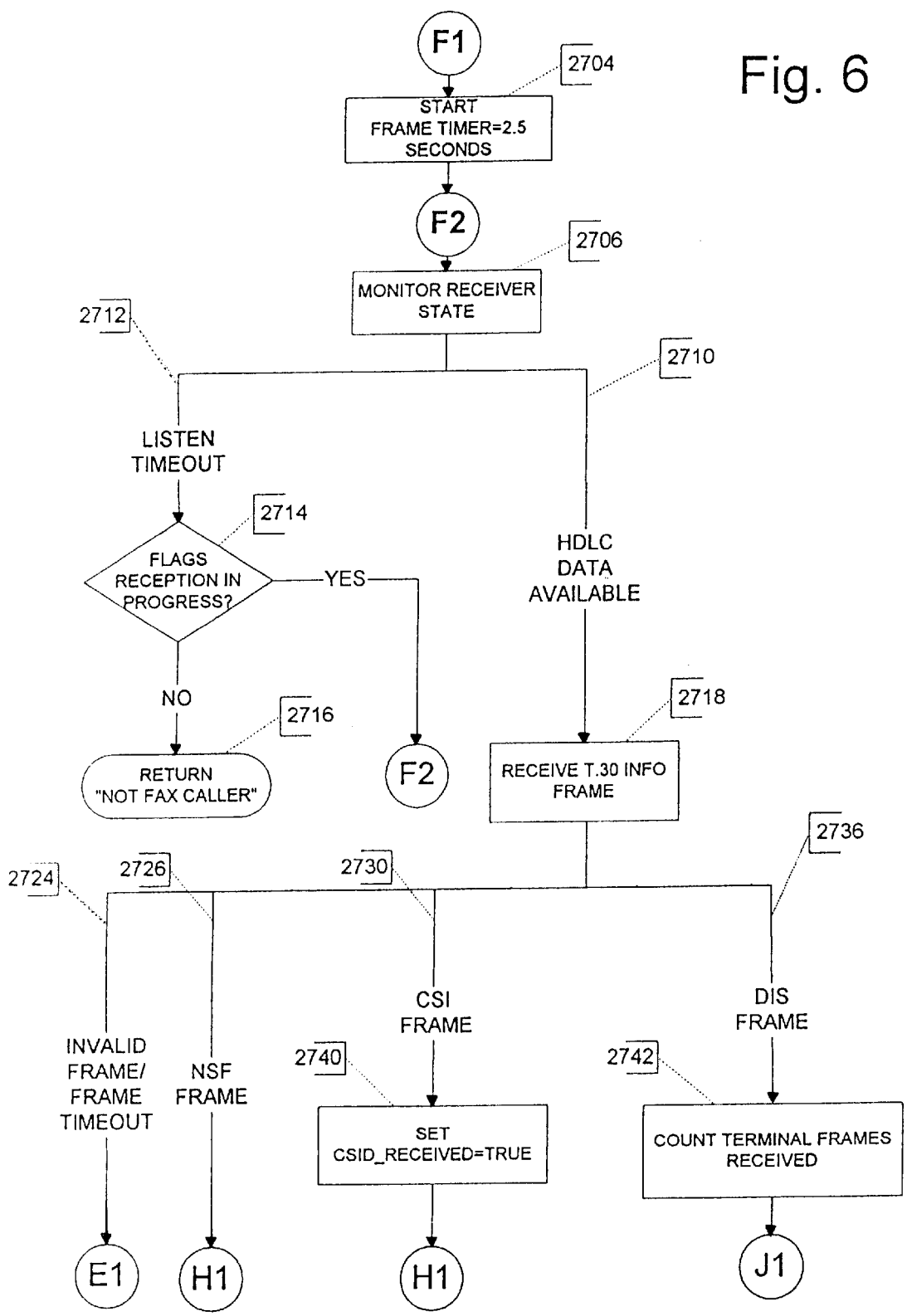

If in monitoring the fax modem receiver state, a V.21 transmission of the High level Data Link Control (HDLC)

flag character (7E hex) is received, branch 2210, the system proceeds to entry point F1 in FIG. 6. To confirm that the HDLC transmission received is valid, the system starts a frame timer set at 2.5 seconds in block 2704, the system then again monitors the receiver state in block 2706. If the listen timer expires, branch 2712, a determination is made if reception of HDLC flags is in process, block 2714. If so, the system returns to entry point F2 to continue monitoring the receiver. If not, the system concludes the earlier HDLC flag reception was erroneous and returns in block 2716 as not a fax caller.

If in monitoring the receiver state in block 2706, HDLC data becomes available in branch 2710 the system in block 2718, will attempt to receive information whose format is expected to conform to that of a valid T.30 message frame. Various frame types may be received. If the content or format of the frame received is invalid or the frame timer expires prior to complete reception of a valid message frame, branch 2724, the system returns to entry point E1 on FIG. 5. If an NSF frame is received, branch 2726, the system proceeds to entry point HI in FIG. 7. Similarly, if a CSI frame is received, branch 2730, the system sets the CSID_RECEIVED flag to true in block 2740 and proceeds to entry point H1.

Figure 7:
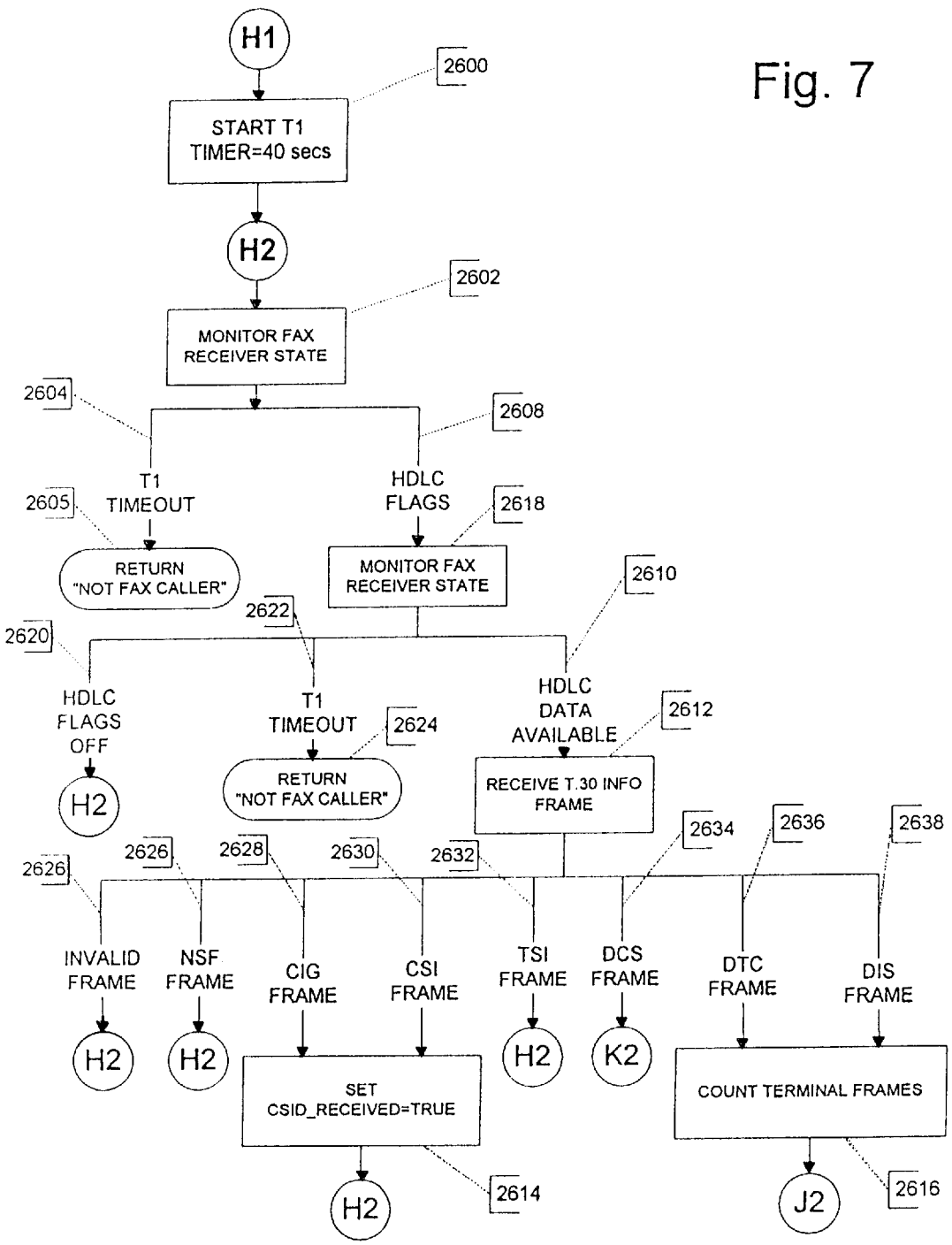

Referring to FIG. 7, the system initiates a T.30 T1 timer of 40 seconds in block 2600 and monitors the fax receiver state in block 2602. If no additional data is received, and the T1 time expires, branch 2604, the system returns identifying the call as not a fax caller in block 2605. If, however, HDLC flags are received, branch 2608, the system continues to monitor the fax modem receiver state in block 2618. If during monitoring, the V.21 transmission of HDLC flag characters is terminated without HDLC data reception, branch 2620, the system returns to entry point H2. If during the monitoring state, the T1 timer expires, branch 2622, the system returns identifying the call as "not a fax caller" in block 2624.

Receipt of HDLC data during monitoring, branch 2610, results in the system receiving information in T.30 message frames in block 2612. As previously discussed with regard to FIG. 6, a plurality of message frame protocols may be received. If an invalid frame, branch 2626, is received, the system returns to entry point H2. Similarly, if an NSF frame, branch 2626, or a TSI frame, branch 2632 are received, the system returns to entry point H2 to continue monitoring. If a CIG frame, branch 2628, or CSI frame, branch 2630 are received, the system sets the variable CSID_RECEIVED to true in block 2614 and then returns to entry point H2 for continued monitoring.

Figure 9:
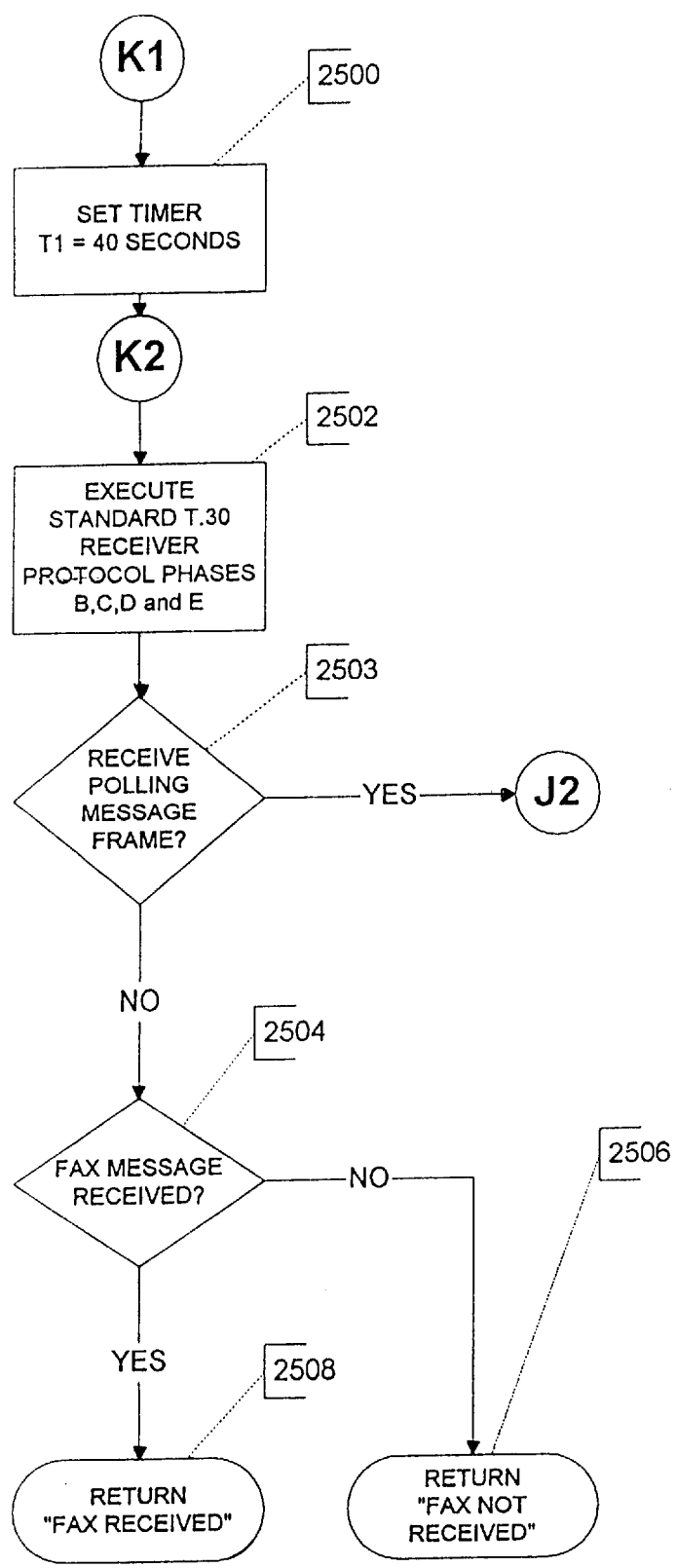

If a DCS frame, branch 2634 is received, the system transitions to entry point K2 in FIG. 9. Receipt of the DCS frame, as shown in the normal communication protocol previously described with respect to FIG. 3, indicates the calling fax intends to send or transmit a facsimile to the system for storage as a message. Consequently, upon entry at K2, the system executes standard T.30 receiver protocol phases B, C, D, and E in block 2502 to receive the message. The system then determines if a fax message was in fact received in block 2504. If so, the system returns to FIG. 3 with the "fax message received" status in block 2508, and the system stores the new message in the mailbox for subsequent retrieval by the subscriber in block 1910. If no fax message is received, the system returns with a "fax not received" status in block 2506 and the system proceeds to entry point A2 for disconnecting the call.

Figure 8:
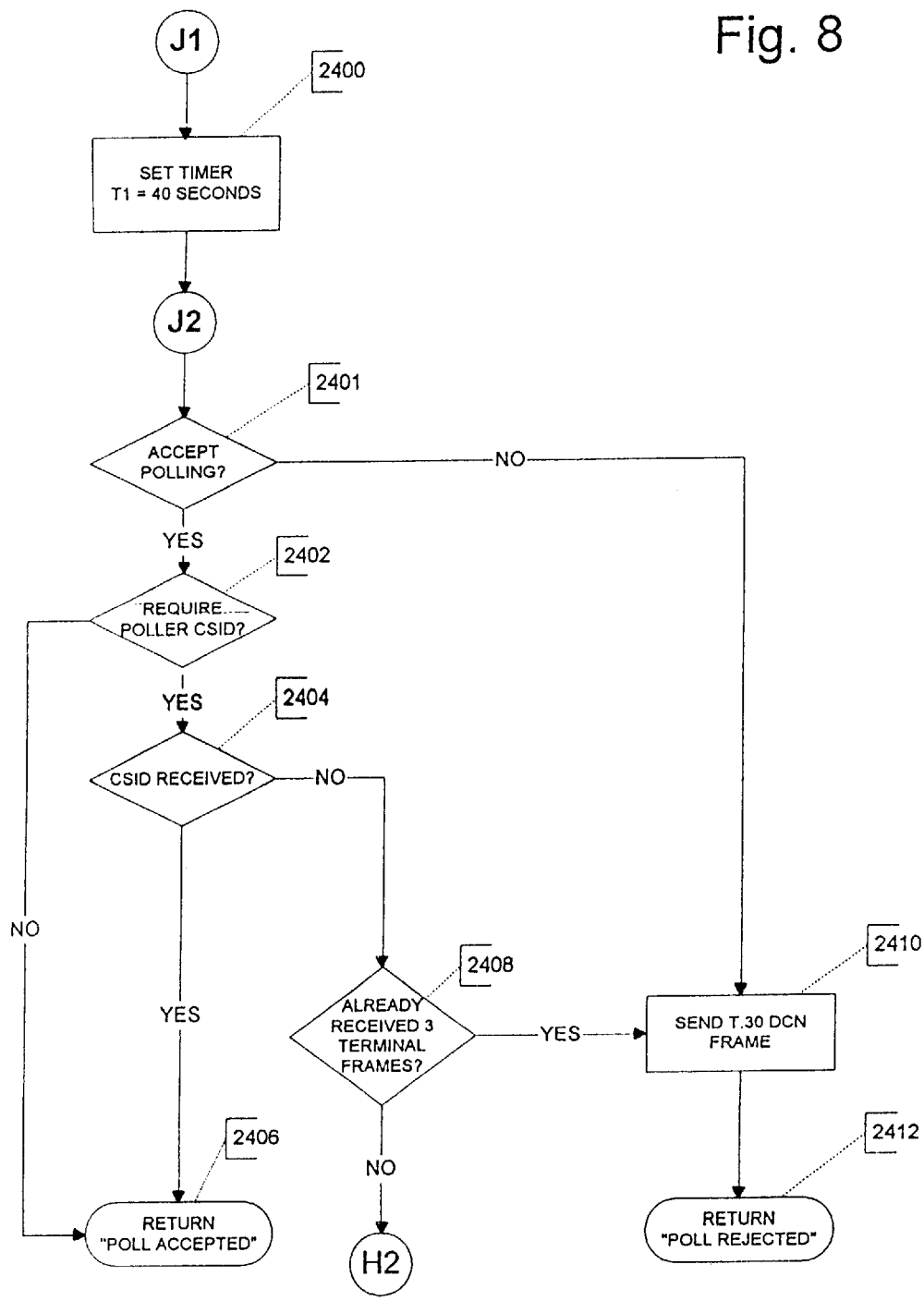

Returning to FIG. 7, if the T.30 frames received in block 2612 are a DTC frame, branch 2636, or DIS frame, branch 2638, the system counts the terminal frames in block 2616 and proceeds to entry point J2 in FIG. 8. Receipt of the DTC frame, as previously described with regard to standard communication protocol in FIG. 11, indicates the calling fax machine intends to poll. Conversely, receipt of a DIS frame indicates that a blind reception by the communicating fax machine is in process as described with respect to FIG. 11, and the system interprets the frame as a fax messaging call.

Referring to FIG. 8, once the system has received either the DTC or DIS frame, a determination is made if polling should be accepted in block 2401. If polling is accepted, a determination is made if the CSID from the polling fax device is required in block 2402. If the CSID is required, a determination is made if CSID has been received in block 2404. If the CSID has not been received, the system determines if three terminal frames have already been received in block 2408. If not, the system returns to entry point H2 in FIG. 28 to continue monitoring the receiver for the CIG frame from a polling fax device, or the CSI frame in a blind reception case. Assuming proper reception of the CIG or CSI frame, the system recycles through the sequence of FIG. 7, alternately receiving the DTC or DIS frame.

If poller CSID is not required in block 2402, or when CSID has been received in block 2404, the system returns to FIG. 3 with a "poll accepted" condition for block 1904. The system then determines if the poller CSID matches the mailbox password in block 1912. If the password is not matched, the system proceeds through entry point A2 to disconnect the call. If the CSID matches the mailbox password, the system transits new fax messages stored in the mailbox to the caller in block 1914. Upon completion of the message retrieval, the system returns through entry point A2 to disconnect the call.

Returning to FIG. 8, if polling is not accepted in block 2401, or if three terminal frames have already been received without successful reception of a CIG/CSI frame, in block 2408, the system responds by sending a T.30 protocol DCN (disconnect) message. The "poll rejected" condition is returned to block 1906 which then proceeds to point A2 to disconnect the call.

Returning to FIG. 5, during monitoring of the fax receiver state in the listen mode, if CNG tone is received, branch 2212, the system starts the T1 timer at 40 seconds in block 2220, and transmits a non-standard facilities (NSF) frame followed by a CSI frame and DIS frame to initiate communication with the calling fax device. The system then transitions through entry point H2 to monitor for further transmissions from the calling fax device as previously described with regard to FIG. 7.

Alternatively, if a CED tone is received, branch 2214, identifying a potential blind reception condition, the system transitions through entry point H1 for the listening procedure previously described with regard to FIG. 7.

If a determination was made in FIG. 3, block 1916 that the mailbox called was a fax only mailbox, but a human caller was present on the line, the system transitions to entry point D1 in FIG. 4. A determination is made if the number of tries to successfully create a fax connection have been exceeded in block 2000. If the allowed number of tries have been exceeded the system returns through entry point A2 to disconnect the call. If the number of tries have not been exceeded, the tries flag is incremented in block 2001 and a prompt is issued by the system to the human caller.

The prompt comprises a prompt initiator issued in block 2002 such as the verbal phrase "you have reached the fax mailbox of ", which is followed by transmission of the mailbox name or number in block 2004 and a prompt terminator in block 2006 which comprises a verbal instruction such as "To begin fax transmission, press the start button on your fax machine now or if you are a subscriber, press star to enter your mailbox" The system then enters a listening period of three seconds in block 2008 to allow sufficient time for mailbox subscribers to respond to the prompt by pressing the star (*) key on their phone.

The system monitors to recognize input events in block 2010 which may comprise receipt of a DTMF * input by the human caller in block 2012, which will result in a standard subscriber log in and message review in block 2008. Log in by prompted entry of a security password is then followed by transmission of synthesized voice messages identifying the date, time and length of facsimile messages available in the mailbox. Upon completion of the review, the system transitions through entry point A2 to disconnect the call.

Alternatively, if the human caller does not desire or is not equipped to receive fax messages and hangs up in block 2014, the system automatically transitions through entry point A2 to disconnect the call.

The system accommodates no input, branch 2016, or input of a DTMF "6", branch 2018, by initiating the VP_RECFAX subroutine with the variable LISTEN_DURATION set to 0.0 seconds. The system then commences listening by entering at B2 in FIG. 3. Setting of the LISTEN_DURATION parameter to 0 forces a "yes" response in block 2202 of FIG. 5, resulting in a transition to entry point K1 in FIG. 9. The system then sets the T1 timer for 40 seconds in block 2500 and executes the standard T.30 receiver protocol phases in block 2502, as previously described and depicted in FIG. 10. Should a caller fail to initiate his or her polling fax station operation during the silent listening period, the polling station may begin sending the DTC or DIS messages of the polling protocol while the server is attempting to execute the standard receiver protocol in block 2502. To accommodate such "late polling" attempts, the system's standard receiver procedure detects the unexpected protocol message elements, terminates the standard receiver protocol and returns the unexpected protocol message frames to block 2503. When polling message elements are returned to block 2503 the system begins executing the polling access procedure at J2.

Having now described the operation of the invention in detail, as required by the patent statutes, those skilled in the art will recognize modifications and substitutions to accommodate embodiments for particular applications or requirements. Such modifications and substitutions are within the scope and intent of the invention as defined in the following claims.

What is claimed is:

1. A method for access to a message storage and retrieval system for voice and fax data, the message storage and retrieval system being connected to a telephone network operating under a ring tone cadence standard, the method comprising the steps or receiving an incoming call from a caller;

generating a ring tone, which follows the ring tone cadence cadence standard, for a predetermined period to condition the caller for a silence period to follow the ring tone in instances where the caller is a human caller;

setting a timer for a second predetermined period corresponding to the predetermined period of the ring tone and the silence period;

monitoring a fax receiver connected by the message storage and retrieval system to the incoming call for identification of fax protocol communications; and providing an indication to the caller upon expiration of the second predetermined period when no fax protocol communications have been identified.

2. The method of claim 1 wherein the ring tone comprises a ring burst of about 1.8 seconds and the silence period comprises a period of about 3.5 seconds.

3. The method of claim 1 wherein the ring tone comprises a ring burst of between 0.67 and 2.5 seconds and the silence period comprises a period of between 3 and 6 seconds.

4. The method of claim 1 wherein the ring tone comprises a ring burst of between 1.8 and 2.2 seconds and the silence period comprises a period of between 3.6 and 4.4 seconds.

5. The method of claim 1 wherein the ring tone comprises a ring burst of about 2 seconds or less.

6. A method for access to a message storage and retrieval system for voice and fax data comprising the steps of:

receiving an incoming call from a caller;

generating a ring tone for a predetermined period to condition the caller for a silence period to follow the ring tone in instances where the caller is a human caller;

setting a timer for a second predetermined period corresponding to the predetermined period of the ring tone and the silence period;

monitoring a fax receiver connected by the system to the incoming call for identification of fax protocol communications wherein the step of monitoring a fax receiver comprises the steps of:

monitoring the fax receiver for a Called station (CED) tone;

setting a second timer for a third predetermined period upon receipt of a CED tone by the fax receiver;

monitoring the fax receiver for receipt of High level Data Link Control (HDLC) flags;

terminating the monitoring for HDLC flags upon expiration of the third predetermined period when no HDLC flags are received; and further monitoring the fax receiver for HDLC data when HDLC flags are received;

transmitting fax messages stored in the system from the system to the caller responsive to HDLC data received; and providing an indication to the caller upon expiration of the second predetermined period when no fax protocol communications have been identified.

7. A method as defined in claim 6 wherein the step of transmitting fax messages is preceded by the steps of:

accepting a called station ID message (CSI) frame, when received by the fax receiver, and setting a polling flag in response to the CSI frame;

comparing the CSI frame to a predetermined security identification code; and enabling the transmission of the fax messages from the system to the caller when the comparison is positive.

8. A method for access to a message storage and retrieval system for voice and fax data comprising the steps of:

receiving an incoming call from a caller;

generating a ring tone for a predetermined period to condition the caller for a silence period to follow the ring tone in instances where the caller is a human caller;

setting a timer for a second predetermined period corresponding to the predetermined period of the ring tone and the silence period;

monitoring a fax receiver connected by the system to the incoming call for identification of fax protocol communications wherein the step of monitoring a fax receiver comprises the steps of:

monitoring the fax receiver for High level Data Link Control (HDLC) flags without receipt of a Called station (CED) tone;

setting a frame timer for a frame time when HDLC flags are received;

monitoring the fax receiver for HDLC data;

determining if HDLC flags are being received by the fax receiver upon expiration of the second predetermined period;

terminating the monitoring when no HDLC flags are being received;

continuing the monitoring of the fax receiver for HDLC data when HDLC flags are being received; and terminating the monitoring of the fax receiver when no HDLC data is received and the frame time has expired;

transmitting fax messages stored in the system from the system to the caller responsive to HDLC data received; and providing an indication to the caller upon expiration of the second predetermined period when no fax protocol communications have been identified.

9. A method as defined in claim 8 wherein the step of continuing the monitoring further comprises the steps of:

accepting a predetermined number of frames of HDLC data received by the fax receiver;

determining when proper access to the system is defined within the predetermined number of frames; and terminating the incoming call when the result of the determination is negative.

10. A method for access to a message storage and retrieval system for voice and fax data comprising the steps of:

receiving an incoming call from a caller;

generating a ring tone for a predetermined period to condition the caller for a silence period to follow the ring tone in instances where the caller is a human caller;

setting a timer for a second predetermined period corresponding to the predetermined period of the ring tone and the silence period;

monitoring a fax receiver connected by the system to the incoming call for identification of fax protocol communications wherein the step of monitoring a fax receiver comprises the steps of:

monitoring the fax receiver for a Calling station tone (CNG);

setting a second timer for a third predetermined period upon receipt of the CNG tone;

sending protocol communications for a called fax device to the caller; and monitoring the fax receiver for receipt of High level Data Link Control (HDLC) flags; and further comprising the steps of:

terminating the incoming call upon expiration of the third predetermined period, when no HDLC flags are received;

monitoring the fax receiver for HDLC data when HDLC flags are received;

accepting a transmitting station ID (TSI) frame when received by the fax receiver when HDLC flags are received;

receiving a fax message from the caller for storage with the TSI frame in the system when HDLC flags are received; and providing an indication to the caller upon expiration of the second predetermined period when no fax protocol communications have been identified.

11. A method as defined in claim 10, wherein the step of monitoring the fax receiver for CNG tone is accomplished in parallel with the step of:

monitoring the fax receiver for a polling message frame; and the method further comprises the steps of:

setting a polling flag when a polling frame is received; and transmitting fax messages stored in the system from the system to the caller, responsive to setting of the polling flag.

12. A method as defined in claim 11 wherein the step of transmitting fax messages is preceded by the steps of:

accepting a Calling Station Identification message (CIG) frame when received by the fax receiver as the polling flag corresponding to the received TSI frame;

comparing the CIG frame to a security identification code; and enabling the transmission of the fax messages from the system to the caller when the result of the comparison is positive.

13. A method as defined in claim 6 or 11 wherein a number called is associated with the incoming call and wherein the step of receiving an incoming call further comprises the steps of:

identifying a mailbox in the system based on the number called associated with the incoming call;

setting a polling variable to accept polling calls when new messages are present in the identified mailbox; and further comprising the step of:

terminating the incoming call prior to transmitting fax messages when the polling variable is not set and a polling frame is received.

14. A method as defined in claim 11 wherein the step of monitoring the fax receiver for a polling message frame further comprises the steps of:

accepting a predetermined number of frames of HDLC data received by the fax receiver;

determining when proper access to the system is defined within the predetermined number of frames; and terminating the incoming call when the result of the determination is negative.

15. An apparatus for access to a message storage and retrieval system for voice and fax data the message storage and retrieval system being connected to a telephone network operating under a ring tone cadence standard, the apparatus comprising:

means for receiving an incoming call from a caller;

means for generating a ring tone, which follows the ring tone cadence standard, for a predetermined period to condition the caller for a silence period to follow the ring tone in instances where the caller is a human caller, said generating means connected to the receiving means;

a first timer initialized for a second predetermined period corresponding to the predetermined period of the ring tone and the silence period;

a fax receiver connected to the receiving means;

means connected to the fax receiver for identification of the receipt of fax protocol communications; and means for providing a voice prompt to the caller upon expiration of the second predetermined period when no fax protocol communications have been identified.

16. The apparatus of claim 15 wherein the ring tone comprises a ring burst of about 1.8 seconds and the silence period comprises a period of about 3.5 seconds.

17. The apparatus of claim 15 wherein the ring tone comprises a ring burst of between 0.67 and 2.5 seconds and the silence period comprises a period of between 3 and 6 seconds.

18. The apparatus of claim 15 wherein the ring tone comprises a ring burst of between 1.8 and 2.2 seconds and the silence period comprises a period of between 3.6 and 4.4 seconds.

19. The apparatus of claim 15 wherein the ring tone comprises a ring burst of about 2 seconds or less.

20. An apparatus for access to a message storage and retrieval system for voice and fax data comprising:
   means for receiving an incoming call from a caller;
   means for generating a ring tone for a predetermined period to condition the caller for a silence period to follow the ring tone in instances where the caller is a human caller, said generating means connected to the receiving means;
   a first timer initialized for a second predetermined period corresponding to the predetermined period of the ring tone and the silence period;
   a fax receiver connected to the receiving means;
   means connected to the fax receiver for identification of the receipt of fax protocol communications wherein the means for identification comprises:
   means for monitoring the fax receiver for receipt of a Called station (CED) tone;
   a second timer responsive to the monitoring means and initialized for a third predetermined period upon receipt of a CED tone;
   second means for monitoring the fax receiver for receipt of High level Data Link Control (HDLC) flags; and
   third means for monitoring the fax receiver for HDLC data responsive to the second monitoring means when HDLC flags are received;
   means for disabling the means for monitoring, the second means for monitoring and the third means for monitoring upon expiration of the third predetermined period when no HDLC flags are received;
   means responsive to the third monitoring means for identifying a Called Station ID message (CSI) frame from the HDLC data, when received, and setting a polling flag in response to the CSI frame;
   means for transmitting fax messages from the system to the caller responsive to the setting of the polling flag; and
   means for providing an indication to the caller upon expiration of the second predetermined period when no fax protocol communications have been identified.

21. An apparatus as defined in claim 20 further comprising:
   a frame timer initialized for a frame time responsive to the second monitoring means when HDLC flags are received without a CED tone; and
   means responsive to the second monitoring means for determining when HDLC flags have been received upon expiration of the second predetermined period.

22. An apparatus as defined in claim 20 further comprising:
   means for comparing the identified CSI frame to a security identification code; and
   means for enabling transmission of the fax messages from the system to the caller when the comparison is positive.

23. An apparatus for access to a message storage and retrieval system for voice and fax data comprising:
   means for receiving an incoming call from a caller;
   means for generating a ring tone for a predetermined period to condition the caller for a silence period to follow the ring tone in instances where the caller is a human caller, said generating means connected to the receiving means;
   a first timer initialized for a second predetermined period corresponding to the predetermined period of the ring tone and the silence period;
   a fax receiver connected to the receiving means;
   means connected to the fax receiver for identification of the receipt of fax protocol communications wherein the means for identification comprises:
   means for monitoring the fax receiver for receipt of a Calling station tone (CNG) tone;
   a second timer initialized responsive to the monitoring means for a third predetermined period upon receipt of the CNG tone;
   means for sending protocol communications for a called fax device responsive to the monitoring means;
   second means for monitoring the fax receiver for receipt of High level Data Link Control (HDLC) flags;
   said means for monitoring and second means for monitoring disabled responsive to the second timer upon expiration of the third predetermined period, when no HDLC flags are received; and
   third means for monitoring the fax receiver for receipt of HDLC data responsive to said second means when HDLC flags are received; said third means identifying a Calling Subscriber Identification Message (CIG) frame from the HDLC data when received;
   means for receiving a fax message from the caller for storage in the system responsive to the CIG frame identified by the third means; and
   means for providing an indication to the caller upon expiration of the second predetermined period when no fax protocol communications have been identified.

24. An apparatus as defined in claim 23, further comprising: fourth means for monitoring the fax receiver for receipt of a polling message frame and setting a polling flag when a polling frame is received; and means for transmitting the fax messages from the system to the caller, responsive to the setting of the polling flag.

25. A method for access to a message storage and retrieval system for voice and fax data wherein an incoming call is associated with a number called to initiate the incoming call comprising the steps of:
   receiving the incoming call from a caller wherein the step of receiving the incoming call includes the steps of:
   determining the number called associated with the incoming call;
   evaluating a mailbox associated with the called number for service type;
   providing a second indication to the caller when fax service is not available to the associated mailbox; and
   determining when the associated mailbox has fax service, if fax messages are present in the associated mailbox and setting a poll flag when such fax messages are determined to be present;

generating a ring tone for a predetermined period to condition the caller for a silence period to follow the ring tone in instances where the caller is a human caller;

setting a timer for a second predetermined period corresponding to the predetermined period of the ring tone and the silence period;

monitoring a fax receiver connected by the system to the incoming call for identification of fax protocol communications; and providing a first indication to the caller upon expiration of the second predetermined period when no fax protocol communications have been identified.

26. A method as defined in claim 25 wherein, the method further comprises the steps of, when the associated mailbox has fax service and does not have voice service:

setting a silence timer for a predetermined silence period;

monitoring for dual tone multi-frequency (DTMF) input from the caller;

responding to a first, predetermined DTMF input by providing subscriber log in and verbal message review;

responding to a second, predetermined DTMF input by initiating called station communications protocol;

monitoring the fax receiver for CNG tone while monitoring for DTMF from the caller;

receiving a Calling station tone (CNG) tone;

setting a second timer for a third predetermined period upon receipt of the CNG tone;

sending protocol communications for a called fax device;

monitoring the fax receiver for receipt of High level Data Link Control (HDLC) flags;

terminating the monitoring of the fax receiver upon expiration of the third predetermined period, when no HDLC flags are received;

monitoring the fax receiver for HDLC data when HDLC flags are received;

receiving a fax message from the caller for storage in the system when no Calling Subscriber Identification Message (CIG) is received; and initiating called station communications protocol upon expiration of the silence period.

27. A method as defined in claim 25 wherein the step of monitoring a fax receiver comprises the steps of:

setting a second timer for a third predetermined period;

monitoring the fax receiver for receipt of HDLC flags;

terminating the step of monitoring the fax receiver for receipt of HDLC flags upon expiration of the third predetermined period when no HDLC flags are received;

monitoring the fax receiver for HDLC data when HDLC flags are received; and further comprising the steps of:

accepting a polling frame, when received, and setting a polling flag in response to the polling frame; and transmitting the fax messages from the system to the caller responsive to setting of the polling flag and the poll flag.

28. A method as defined in claim 27 wherein the step of transmitting fax messages is preceded by the steps of:

receiving a station ID frame corresponding to the accepted polling frame;

comparing the station ID frame to a security identification code; and enabling the transmission of the fax messages from the system to the caller when the comparison is positive.

29. An apparatus for access to a message storage and retrieval system for voice and fax data wherein a number called is associated with an incoming call comprising:

means for receiving the incoming call from a caller, wherein the means for receiving the incoming call includes:

means for determining the number called associated with the incoming call; and means responsive to the number determining means for evaluating a mailbox associated with the called number, aid evaluation means having:

first means for determining when fax service is available to the called mailbox;

second means for determining if any fax messages are present in the mailbox and setting a poll flag to enable the apparatus to monitor the fax receiver for a polling signal when such fax messages are determined to be present; and means for accepting the incoming call as a voice call responsive to said first determining means when fax service is not available;

means for generating a ring tone for a predetermined period to condition the caller for a silence period to follow the ring tone in instances where the caller is a human caller, said generating means connected to the receiving means;

a first timer initialized for a second predetermined period corresponding to the predetermined period of the ring tone and the silence period;

a fax receiver connected to the receiving means;

means connected to the fax receiver for identification of the receipt of fax protocol communications; and means for providing an indication to the caller upon expiration of the second predetermined period when no fax protocol communications have been identified.

* * * * *